| United States Patent [19] | [11] Patent Number: 4,500,558 |
| Fulger et al. | [45] Date of Patent: Feb. 19, 1985 |

[54] MODIFICATION OF BRAN BY EXTRUSION

[75] Inventors: Charles V. Fulger, Millwood; Allan G. Bradbury, Tarrytown, both of N.Y.

[73] Assignee: General Foods Corporation, White Plains, N.Y.

[21] Appl. No.: 611,651

[22] Filed: May 18, 1984

Related U.S. Application Data

[63] Continuation-in-part of Ser. No. 457,993, Jan. 14, 1983, abandoned.

[51] Int. Cl.³ ............................ A23L 1/10; A23P 1/00
[52] U.S. Cl. .................................... 426/622; 426/463; 426/516
[58] Field of Search ............... 426/463, 464, 516, 622, 426/615

[56] References Cited

U.S. PATENT DOCUMENTS

| 897,854 | 9/1908 | Schlüter | 426/463 |
| 3,458,321 | 7/1969 | Reinhart et al. | 426/463 |

FOREIGN PATENT DOCUMENTS 1561190  2/1980  United Kingdom ............... 426/516

*Primary Examiner*—Raymond Jones
*Assistant Examiner*—Elizabeth C. Weimar
*Attorney, Agent, or Firm*—Thomas A. Marcoux; Thomas R. Savoie; Daniel J. Donovan

[57] ABSTRACT

The invention relates to a process for the modification of bran comprising forming a bran and water feed having a bran to water ratio of from 5.5:1 to 10:1 and extruding the feed in a counter-rotating twin screw extruder under high temperature and high shear conditions. The modified bran is more readily millable and when milled will possess a mouthfeel with an absence of grittiness and a greater functionality in a food product.

6 Claims, 5 Drawing Figures

SCANNING ELECTRONMICROGRAPHS OF CORN BRAN

UNMODIFIED DRY MILLED CORN BRAN.

DRY MILLED CORN BRAN MODIFIED AFTER EXTRUSION.

UNMODIFIED DRY MILLED CORN BRAN AFTER MILLING.

DRY MILLED CORN BRAN MODIFIED AFTER EXTRUSION AND MILLING.

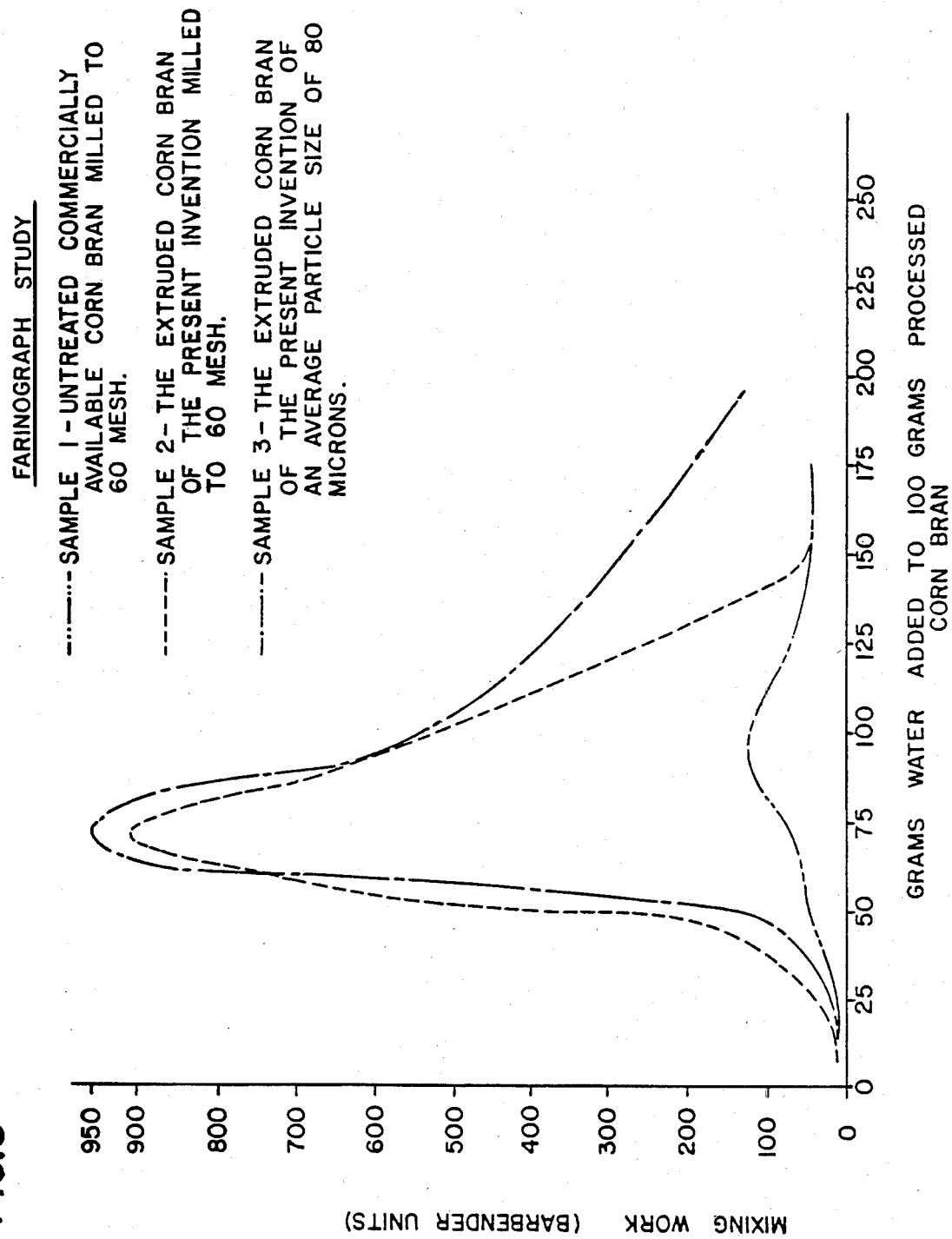

MODIFICATION OF BRAN BY EXTRUSION

This is a continuation-in-part of application Ser. No. 457,993, filed Jan. 14, 1983, now abandoned.

TECHNICAL FIELD

This invention relates to food products and more particularly to a process for the modification of bran by extrusion and the product produced by this process.

BACKGROUND ART

Bran is a low-cost, food-grade material which has found its greatest utility as a cereal fiber source. Bran as supplied by the millers, is unsatisfactory when used as a food ingredient because of its lack of functionality in products and its poor organoleptic properties. It is a poor water binder and has a harsh, gritty mouthfeel which comes through when it is used in a cereal formulation. It is well known tht bran is a source of natural fiber and that natural fiber is biologically active and highly desirous in food, serving an important function in human digestion. For instance, fiber is an important aid to regularity and may be helpful by adsorbing bile acids, and by increasing the volume and moisture content in the intestines.

It is an object of the present invention to improve the functionality of bran and overcome objections which have hindered and full utilization of this material in foodstuffs.

DISCLOSURE OF THE INVENTION

The invention relates to a process for subjecting bran to a high temperature, high shear extrusion in a counter-rotating twin screw extruder which will modify the structure of the bran such that it becomes more readily millable. Additionally, the invention relates to a process whereby from 10 to 25% starch is naturally present or is added to the bran material, the starch functioning to form a vapor lock thereby allowing a buildup of pressure, high temperature, and high shear, said starch also gelatinizing during the extrusion process thereby coating the bran. The bran that is produced by this process, after milling, has an acceptable mouthfeel with an absence of grittiness, a higher moisture holding capacity and additionally the bran material has unexpected texture forming properties which can be made use of in a wide variety of food products.

BRIEF DESCRIPTION OF DRAWINGS

FIG. 1 is a SEM of dry milled corn bran and FIG. 2 is a SEM of the same bran after the modification (extrusion) of the present invention. FIG. 3 is a SEM of milled unmodified dry milled corn bran and FIG. 4 represents the milled modified bran of the present invention.

FIG. 5 represents a Farinograph Study comparing the modified bran of the present invention versus and unmodified, commercially available bran. Further discussion is provided in Example 3.

BEST MODE FOR CARRYING OUT THE INVENTION

Figure 1:
FIGS. 1 through 4 are scanning electronmicrographs (SEM).

The invention relates to a process for the modification of bran comprising combining bran with water to form a feed, introducing the feed into a counter-rotating twin screw extruder, extruding under high temperature, sufficient pressure and sufficient shear to produce a modified bran product which can be milled at an increased rate and to a finer particle size. Also, when milled, the modified bran will possess a mouthfeel with an absence of grittiness and greater functionality.

A key step in the modification process of this invention is the use of a high temperature, high shear, counter-rotating twin screw extruder. An example of such an extruder is one manufactured by Welding Engineers. These types of extruders typically find their greatest applicability in the plastics industry and the use of this type of extruder for the preparation of food ingredients is believed to be limited.

Since bran is an extremely difficult material to comminute, sufficient shear and pressure must be applied to modify the structure of the bran. The heat in the extruder must be sufficient to dextrinize any starch present in the material. The term dextrinizing implies that the crystalline structure of the starch granule is gelatinized and the gelatinized starch is converted at least partially into an amorphous mass of dextrins.

Shear for purposes of this invention is defined as the change in velocity of the flowing fluid (feed material) with respect to its position in the channel. The amount of shear is a function of the screw speed, channel depth (defined as the space between the screw and the barrel) and the barrel diameter. The shear rate was calculated for the process of the present invention according to the following formula:

$$\text{Shear rate} = \pi D n / h$$

where:
Shear rate is expressed in seconds$^{-1}$;
D = barrel/screw diameter in inches;
n = screw speed in revolutions per second; and
h = channel depth in inches. The value for h is calculated according to the following formula:

$$h = \frac{\text{screw diameter} - \text{root diameter}}{2}$$

from the above information, it was determined that effective shear rates in the maximum shear zone for the bran modification process of the present invention would range from a minimum of approximately 500 seconds$^{-1}$ to a maximum of approximately 2000 seconds$^{-1}$.

The only direct heat applied to the extruder was from the steam jacket which was heated up to about 180° C. at the terminal end of the extruder barrel. However, most of the heat in the extruder was generated from mechanical energy.

The bran:water composition of feed can vary from 5.5:1 to 10:1 with the optimal ratio of 7:1. Decreasing the ratio gave a product that was more expanded to a lower density but was functionally less modified. Increasing the ratio gave an extrudate that had hardly any grittiness but had off-color and odor from overtoasting.

The maximum temperature attained at the outlet of the counter-rotating twin screw extruder was 180° C. The temperature range may vary from 150° to 180° C. preferably from 160° C.–170° C. The amount of shear generated within the extruder is sufficient to impart to the product the heat needed to obtain the operational temperatures and stress the material. Residence times in the extruder varied from 10 to 30 seconds. The screw r.p.m. varied from approximately 250 to 475 and the amps supplied varied from 40 to 70.

According the present invention an amount of starch of from 10% to 25% on a dry weight basis, preferably 15% to 20% is present in the bran starting material. Alternatively, if a bran starting material is utilized which contains little or no starch such as wet milled corn bran, an amount of starch can be admixed with the bran present in the feed such that the admixture of bran and starch will contain from 10% to 25% starch on a dry weight, total basis, preferably 15% to 20%. The starch functions as a rheology modifying component in order to facilitate the effective conveyance, molding and thus shearing by the action of the screws within the extruder. The rapid gelatinization of the starch in the bran by the heat and pressure in the extruder provides the viscosity necessary to impart fluidity and to fill the spaces between the fiber fragments. Attempts to modify wet milled corn bran, which possesses a negligible starch content (because of extraction of the starch in the commercial wet milling process), did not produce a modified product. However, when wet milled corn bran is preblended with corn starch at a 10% to 25% weight basis, an extrudate resembling the extrudate which would be obtained from a dry milled corn bran (which contains approximately 20% starch) was obtained.

Preferably, after the material exits the extruder it will be milled either in a conventional food mill such as a Homoloid Fitzmill (The Fitzpatrick Company, Elmhurst, IL) or an impact mill such as produced by Vortec Products Company (Long Beach, CA). On milling, the bran modified by extrusion shatters to give unexpectedly smaller particles than unextruded bran. The analysis of the modified bran shows that the grittiness of the mouthfeel of the original bran is greatly reduced and the modified bran material has a slightly toasted and pleasant aroma. The material also shows increased functionality in that when it is added to water it readily absorbs it and forms a viscous paste. While the functionality and mouthfeel of the material are affected, the dietary fiber content as measured by the Van Soest procedure remains virtually unaltered and the crude fiber level is only marginally lower in extruded bran as compared to traditional bran.

The modification process of the present invention will be effective in changing the physical characteristics (mouthfeel, functionality, etc.) of all of the following brans: corn, wheat, barley, rye, and combinations of these brans. The modified bran products can be used in various food products at a level of from 1% to 100% by weight. Specific examples of food products are breakfast cereals including expanded cereal products and cereal flakes, high fiber breads and bakery products, whole grain malt ingredients, fiber fortified pasta products, fabricated food products such as sausage and meat analogs, confectionary products and pet foods. The modified bran could also be utilized as a pharmaceutical diet aid.

Figure 2:
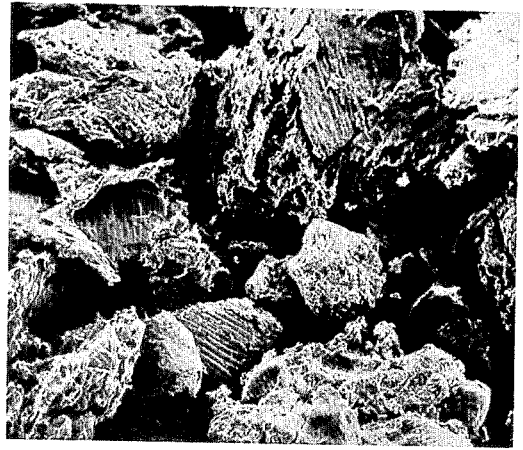
Figure 3:
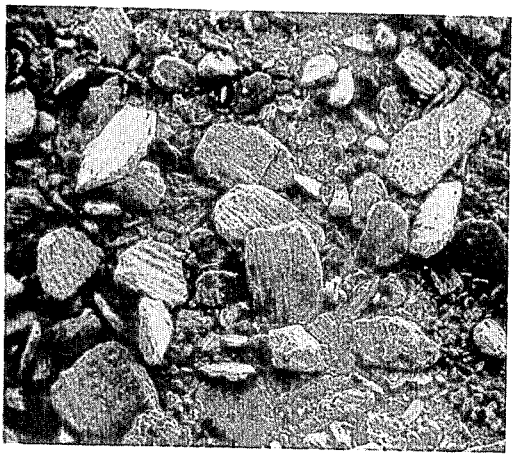
Figure 4:

Scanning electronmicrographs (SEM) of the dry milled corn bran before (FIG. 1) and after extrusion (FIG. 2) show marked differences. Angular edged corn bran particles are still visible in the modified fraction although a smooth textured material, much of which is probably fiber coated with gelatinized starch, is also visible. The SEM photographs in FIG. 3 and FIG. 4 indicate that on milling extruded bran readily shatters to give smaller particles then the unmodified, unextruded bran does. This was observed by milling both original unmodified bran and the modified bran of the present invention on a Homoloid Fitzmill. FIG. 3 is a SEM photograph of unmodified bran after it is milled and FIG. 4 represents the milled extruded bran. The ability of the modified bran to shatter on milling is significant as reduction of particles size is concomminant with a smoother, less gritty mouthfeel.

The invention is further illustrated but not limited by the following examples.

EXAMPLE 1

A Welding Engineers' (King of Prussia, PA) counter-rotating tangential twin screw extruder was used to extrude dry milled corn bran (60 mesh, from Illinois Cereal Mills). The extruder had two four feet long screws in adjacent barrels of two inches diameter. Screws consisted of a number of smaller sections each which were flighted (pitch 2 in., clearance ca. 3 thou.) and driven by a motor capable of 100 H.P. and screw rpm of 475. The terminal end of the extruder barrel was heated by a pressurized steam jacket, maximum temperature 170° C. Bran was fed continuously to the head of the screws from a feed hopper, and a separate pump supplied a steady stream of water to the same inlet.

A desirable modification was obtained by extruding under the following conditions: feed rate 120 lb/hr., water rate 18 lb/hr., screw rpm 275, 50 amps, H.P. 20, max. temp. in barrel, 165° C., the bran:water ratio of the feed was 7:1. Each screw consisted of six forward flighted sections with length and root diameter (from feed end): 17.75 in., tapered 1.375 in. to 1.625 in.; 10.5 in., 1.625 in., 10.5 in., 1.625 in.; 4.75 in., 1.735 in.; 10.5 in., 1.625 in.; 3 in., 1.945 in.; 3 in., 1.955 in.

The maximum shear rate for the conditions set forth above was approximately 1100 seconds$^{-1}$. The maximum shear rate calculated according to the previously discussed formula was approximately 1280 seconds$^{-1}$. Since in this example a counter-rotating tangential twin screw extruder was employed, an adjustment was made to the calculated shear rate by multiplying the calculated shear rate by 85%. This was necessitated by the fact that in the particular extruder utilized, 85% of the screw is surrounded by the barrel wall and 15% is open (this 15% open area represents the tangential area between the two screws).

The extrudate consisted of 70 lb. of small "puffed" material (obtained from the periphery of the screw) and 40 lb. of hard strips (from triangular shaped areas tangential to the screws). The former, more desirable, material was separated from the mixture by means of a large mesh sieve. Both modified materials ground in a Homoloid Fitzmill. The material obtained from the periphery of the screw, after milling, tended to be more modified.

EXAMPLE 2

The same processing conditions as Example 1 were utilized with the exception that the screw speed was increased to 475 rpm and a constant bran: water ratio of 7:1 was maintained at the feed inlet. This resulted in a higher feed rate and a higher proportion of the peripheral "puffed", material. Equipment design could further reduce or eliminate the less desirable fraction.

In a similar manner as discussed in Example 1 utilizing the previously discussed formula, the maximum calculated shear rate was approximately 2211 seconds$^{-1}$ which then adjusted in like manner gave a correct value of approximately 1880 seconds$^{-1}$.

EXAMPLE 3

In order to prove that the modified bran of the present invention possesses a better texture forming property as compared with the unmodified bran, a Farinograph technique was employed involving the addition of progressively increasing levels of room temperature distilled water to 100 grams of corn bran both modified and unmodified. The Brabender Farinograph measures the resistance of the bran water mixture to mixing blades at constant speed as a function of water addition.

Three samples compared. Sample 1 was a commercially available corn bran which was untreated and which was milled in a Fitzmill to 60 mesh. Sample 2 represents a corn bran which was extruded according to the process of the present invention and subsequently milled in a Fitzmill to 60 mesh. Sample 3 was likewise extruded but was micromilled in a M-1 Vortec Product Company impact mill equipped with a $C_1$ air classifier with the throttle set at 40% produce modified bran particles of an average particle size of 80 microns. The extruded samples clearly perform differently in comparison to the unextruded samples as shown in FIG. 5. The extruded corn brans attain significantly higher forces (850-950 Brabender units) when 75 grams of water were added.

EXAMPLE 4

In order to prove that on milling, the extruded bran of the present invention will produce smaller particles than unmodified bran, both the modified bran produced in accordance with Example 1 and commercially available corn bran (from Illinois Cereal Mills) were ground in a Homoloid Fitzmill fitted with a 40 mesh screen. If a 60 mesh screen was used, the unmodified bran could only be milled with difficulty due to screen blockage and over-heating. A particle size analysis of both materials yielded the following results:

| Modified Bran by Extrusion | | Commercially Available Bran | |
|---|---|---|---|
| 40 mesh | 100% through | 97% through | |
| 50 mesh | 97% through | 33% through | |
| 70 mesh | 62% through | 17% through | |
| 100 mesh | 38% through | 10% through | |
| 200 mesh | 3% through | 0% through | |

EXAMPLE 5

Another technique was utilized to quantify physical differences among the three samples previously described in Example 3. A technique was developed to quantify the amount of water a sample of corn bran retained after contact with filter paper. The procedure utilized in this experiment involved the following steps:

1. Place 9 cm Whatman #4 filter paper in 80° C. oven for one hour, remove and place in desicator and imprint ½" circle.
2. Mix sample with three times its weight in water. Allow it to equilibrate 30 minutes.
3. Weigh filter paper and add enough sample to cover ½" circle. Place it in analytical scale chamber for three minutes. Weigh sample and paper.
4. Bore out sample with ½" cork bore, weigh paper.
5. Place paper in 680° C. oven for one hour, place in desicator and weigh it.

Following the above procedure will allow one to calculate the amount of water retained by a given sample weight. The average of three runs is expressed in Table 1 as a percentage of water retention per sample weight.

TABLE I

| | % WATER RETENTION |
|---|---|
| SAMPLE # | AVERAGE % WATER RETENTION |
| 1 | 42.8 |
| 2 | 83.6 |
| 3 | 86.6 |

As is evident from reading the table, a significant improvement in water retention is achieved in the modified samples (Sample 2 and 3) as compared to the untreated sample (Sample 1). The water retention of the corn bran was almost double from 42.8% in the untreated samples to 83.6% and 86.6% in the samples that were modified by the extrusion process of the present invention.

We claim:
1. A process for the modification of bran comprising:
   (a) combining bran with water to form a feed having a bran to water ratio of from 5.5:1 to 10:1; said bran containing from 10% to 25% starch on a dry weight basis, said starch either being naturally present in the said bran or admixed therewith;
   (b) introducing the feed into a counter-rotating twin screw extruder;
   (c) extruding the feed at a temperature of from 150° C. to 180° C.; and
   (d) developing a shear rate of from 500 to 2000 seconds$^{-1}$ in said extruder through which the said feed is extruded.
2. The process of claim 1 wherein the bran contains from 15% to 20% starch on a dry weight basis.
3. The process of claim 1 wherein the temperature is from 160° C. to 170° C.
4. The process of claim 1 wherein residence time in the extruder is from 10 to 30 seconds.
5. The process of claim 1 wherein the bran is selected from the group consisting of corn, wheat, barley, rye and combinations thereof.
6. The process of claim 1 further comprising the step of milling the extruded bran.

* * * * *